United States Patent

Mancell

[11] Patent Number: 5,906,221
[45] Date of Patent: May 25, 1999

[54] RESERVOIR FOR POWER STEERING FLUID

[75] Inventor: Michael G. Mancell, Chatham, Canada

[73] Assignee: Ventra Group Inc., Ontario, Canada

[21] Appl. No.: 08/657,873

[22] Filed: May 31, 1996

[30] Foreign Application Priority Data

Apr. 3, 1996 [CA] Canada ................................... 2173380

[51] Int. Cl.⁶ ................................................ B01D 35/027
[52] U.S. Cl. .......................... 137/549; 210/130; 210/448; 210/DIG. 17
[58] Field of Search .................... 210/130, 448, 210/168, DIG. 17; 137/549

[56] References Cited

U.S. PATENT DOCUMENTS

| | | | |
|---|---|---|---|
| 3,334,747 | 8/1967 | Niccum et al. | 210/130 |
| 3,772,962 | 11/1973 | Suzuki | 91/359 |
| 3,859,216 | 1/1975 | Sisson et al. | 210/DIG. 17 |
| 4,185,713 | 1/1980 | Williams et al. | 180/242 |
| 4,190,130 | 2/1980 | Beck | 180/133 |
| 4,212,366 | 7/1980 | Ohtuka et al. | 180/141 |
| 4,212,739 | 7/1980 | Hilton et al. | 210/130 |
| 4,227,440 | 10/1980 | Leonard | 91/51 |
| 4,243,353 | 1/1981 | Reed | 414/439 |
| 4,245,785 | 1/1981 | Johansing, Jr. | 239/112 |
| 4,252,274 | 2/1981 | Kubacak | 239/163 |
| 4,265,331 | 5/1981 | Leonard | 181/119 |
| 4,283,990 | 8/1981 | Leonard | 91/47 |
| 4,299,302 | 11/1981 | Nishikawa et al. | 180/148 |
| 4,315,565 | 2/1982 | Low | 192/113 B |
| 4,315,602 | 2/1982 | Kubacak et al. | 239/163 |
| 4,335,645 | 6/1982 | Leonard | 91/388 |
| 4,338,855 | 7/1982 | Ideta | 91/378 |
| 4,354,422 | 10/1982 | Nishikawa et al. | 91/358 R |
| 4,359,869 | 11/1982 | Ideta | 60/547 B |
| 4,377,217 | 3/1983 | Nishikawa et al. | 180/143 |
| 4,388,196 | 6/1983 | Lucia | 210/168 X |
| 4,401,880 | 8/1983 | Eizenhoefer | 218/213 |
| 4,404,897 | 9/1983 | Leonard | 91/506 |
| 4,410,193 | 10/1983 | Howard | 280/90 |
| 4,418,931 | 12/1983 | Howard | 280/94 |
| 4,419,042 | 12/1983 | Reed | 414/786 |
| 4,465,167 | 8/1984 | Fujioka | 192/3.57 |
| 4,485,623 | 12/1984 | Chichester et al. | 60/422 |
| 4,517,800 | 5/1985 | Karakama et al. | 60/337 |
| 4,573,319 | 3/1986 | Chichester | 60/422 |
| 4,575,422 | 3/1986 | Zimmer | 210/168 X |
| 4,597,352 | 7/1986 | Norminton | 114/254 |
| 4,601,358 | 7/1986 | Kozuka et al. | 180/141 |
| 4,616,728 | 10/1986 | Suzuki et al. | 180/142 |
| 4,655,039 | 4/1987 | McCabe et al. | 60/328 |
| 4,753,296 | 6/1988 | Kruithoff | 171/26 |
| 4,763,800 | 8/1988 | Engler et al. | 212/195 |
| 4,874,283 | 10/1989 | Hurley, Jr. | 414/504 |
| 5,009,066 | 4/1991 | Vangorder et al. | 60/415 |
| 5,037,486 | 8/1991 | Sloan | 134/18 |
| 5,093,949 | 3/1992 | Sloan | 15/1.7 |
| 5,104,294 | 4/1992 | Banba | 417/36 |
| 5,168,949 | 12/1992 | Emori et al. | 180/143 |
| 5,301,766 | 4/1994 | Momiyama et al. | 180/197 |
| 5,403,238 | 4/1995 | Baxter et al. | 472/43 |
| 5,473,990 | 12/1995 | Anderson et al. | 104/85 |

*Primary Examiner*—John Rivell
*Attorney, Agent, or Firm*—Cushman Darby & Cushman IP Group of Pillsbury Madison & Sutro LLP

[57] ABSTRACT

This invention relates to an improved reservoir for power steering fluid which is particularly suitable for use on large vehicles, such as trucks. The improved reservoir of this invention comprises a well to contain a surplus of power steering fluid. The well has an inlet to permit the introduction of fluid from a power steering mechanism into the well, and an outlet to permit the fluid to flow out of the well to the power steering mechanism. The well also has a filter attached over the inlet. The filter comprises a container having a lower chamber, a side chamber, a filter medium and a relief valve. Fluid received in the lower chamber from the inlet pipe flows to the side chamber and through the filter medium from the outside surface to the inside surface, and then out through a center orifice to the well. Fluid at or above a predetermined pressure flows through the pressure relief valve and out through the center orifice to the well.

5 Claims, 4 Drawing Sheets

RESERVOIR FOR POWER STEERING FLUID

FIELD OF THE INVENTION

This invention relates to improvements in the construction of a reservoir for power steering fluid having particular application to large vehicles such as trucks. More precisely, the invention relates to a novel filter in a novel combination with an oil reservoir.

BACKGROUND OF THE INVENTION

A power steering mechanism usually has a surplus of power steering fluid contained in a reservoir. A filter is usually provided to clean the fluid as it circulates through the reservoir and back to the power steering mechanism. Known reservoirs generally comprise a well to contain the fluid, an inlet pipe to receive the fluid from the power steering mechanism, an outlet pipe to permit the fluid to flow back into the power steering mechanism, a filter positioned over the inlet pipe to filter impurities from the power steering fluid as it passes into the well, and a removable well cap to permit an operator to add additional power steering fluid or to change the filter. The filter commonly used is a ring-type filter which surrounds the inlet so that incoming power steering fluid flows into the centre of the ring, through the filter medium from an inside surface to an outside surface of a filter medium and into the well. The centre orifice of the ring filter is located over the inlet and is topped with a pressure relief valve to permit fluid under excessive pressure to flow directly through the centre orifice of the ring through the pressure relief valve and into the well without passing through the filter. A dipstick is ordinarily provided in a port in the removable cap to test the level of the fluid in the well without removal of the well cap. Usually the fluid level in the well completely submerses the filter.

SUMMARY OF THE INVENTION

This invention relates to an improved reservoir for power steering fluid which is particularly suitable for use on large vehicles, such as trucks. The improved reservoir of this invention comprises a well to contain a surplus of power steering fluid. The well has an inlet to permit the introduction of fluid from a power steering mechanism into the well, and an outlet to permit the fluid to flow out of the well to the power steering mechanism. The well also has a filter attached over the inlet. The filter comprises a container having a lower chamber, a side chamber, a filter medium and a relief valve. Fluid received in the lower chamber from the inlet pipe flows to the side chamber and through the filter medium from the outside surface to the inside surface, and then out through a centre orifice to the well. Fluid at or above a predetermined pressure flows through the pressure relief valve and out through the centre orifice to the well.

In one preferred embodiment of this invention, the inlet is placed in the floor of the well, and the filter container is screwed onto the inlet opening. In this embodiment, the filter may be replaced by unscrewing the filter container and replacing it with a new filter container, which is screwed in place over the inlet mechanism. The reservoir well is equipped with a removable lid to permit entry into the well.

In another preferred embodiment, the inlet is located in the removable lid and the filter attached over the inlet so that the filter may be changed by removing the removable lid and unscrewing the filter without having to dip one's hand into the fluid.

By reason of the filter construction, the fluid entering the lower chamber passes through the filter from the outside to the inside, rather than, as in the prior art, from the inside to the outside of the filter medium. Thus the contaminants are taken up on the larger outside surface and, accordingly, do not cover and block the filter surface as quickly as they might on the smaller inside surface. Furthermore, in the prior art, fluid flushing along the inside surface of the filter medium through the relief valve would flush any contaminants on the inside surface into the well of the reservoir. The filter of this invention, capturing the contaminants on the outside of the filter medium, does not expose the contaminants to flushing as high pressure fluid from the relief valve passes along the inside surface of the filter medium. This method of cleaning power steering fluid as it circulates through a reservoir and back to the power steering mechanism using the filter of this invention can be summarised by the steps of 1) receiving the fluid through the inlet orifice from the inlet to the lower chamber, 2) directing the fluid to the side chamber then 3) through the filter medium from the outer surface of the filter medium to the inner surface of the filter medium so that the contaminants in the fluid are taken up on the larger outer surface, then 4) directing the fluid to the exit orifice of the container and into the well of the reservoir.

These and other advantages will become apparent upon reading this disclosure.

DESCRIPTION OF THE FIGURES

In the figures which illustrate the preferred embodiments of this invention.

DESCRIPTION OF THE INVENTION

Figure 1:
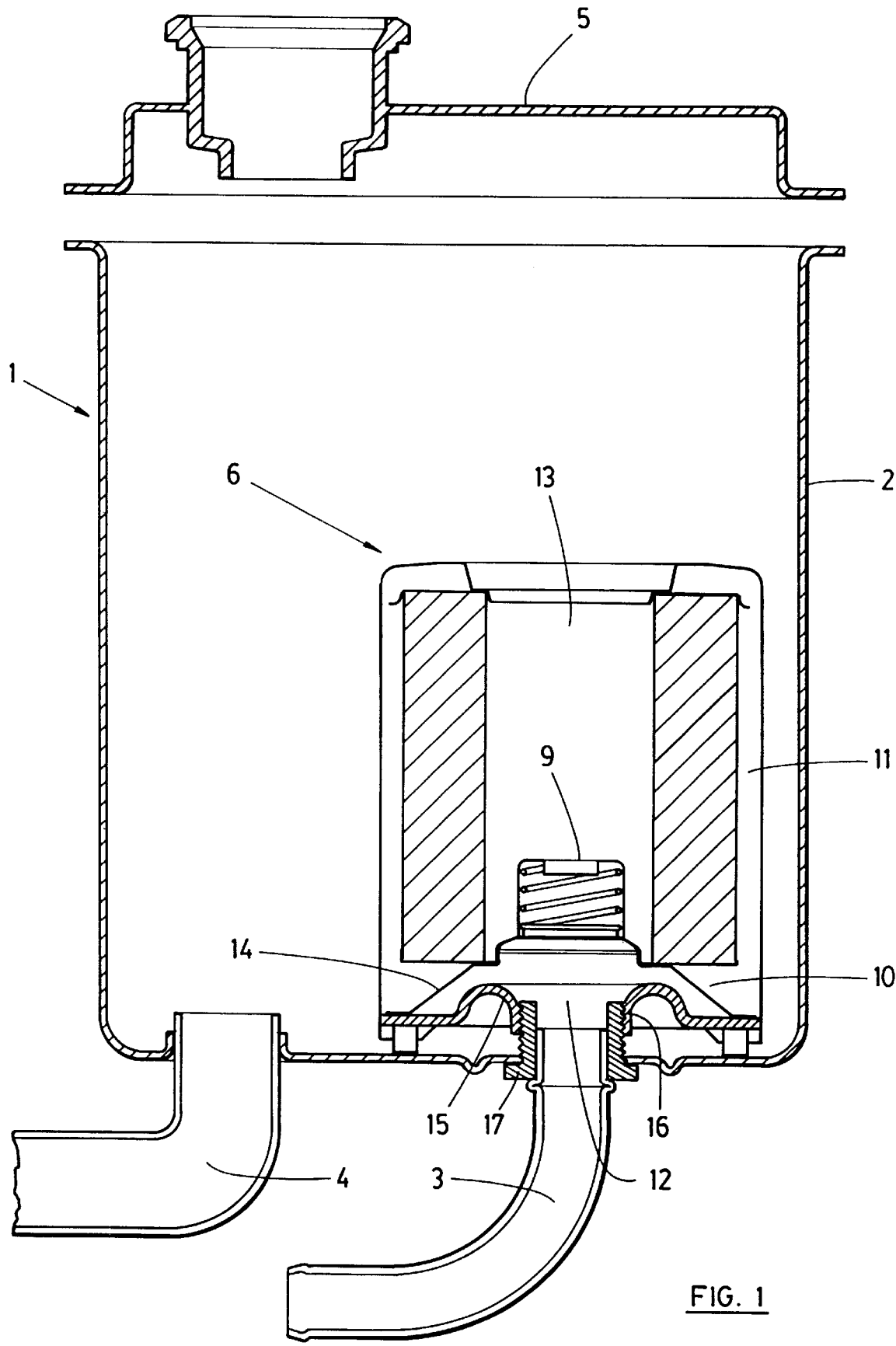
FIG. 1 is a sectional side view of one embodiment of the improved reservoir of this invention.
Figure 2:
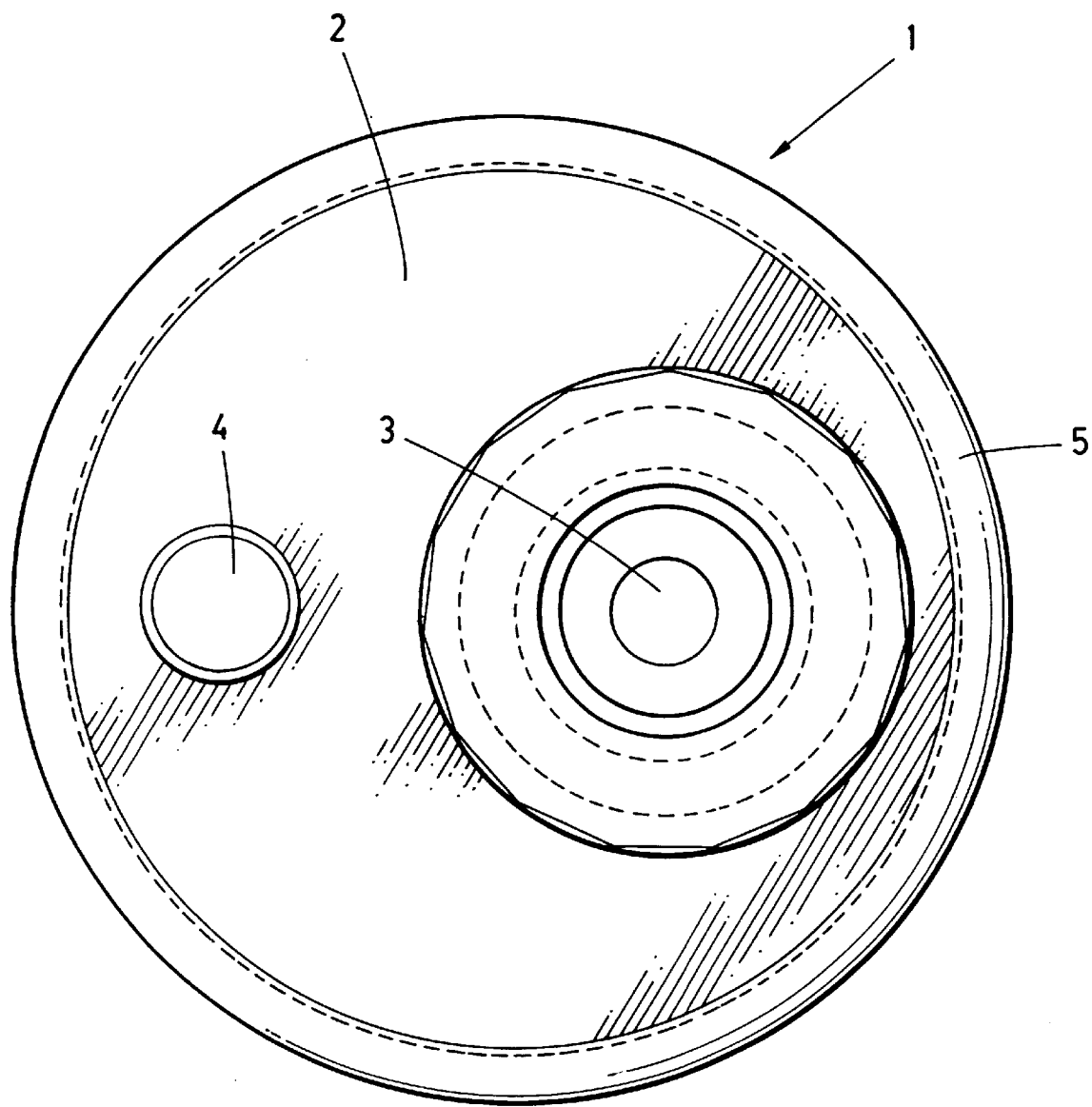
FIG. 2 is a top view into the well of the improved reservoir shown in FIG. 1.
Figure 3:
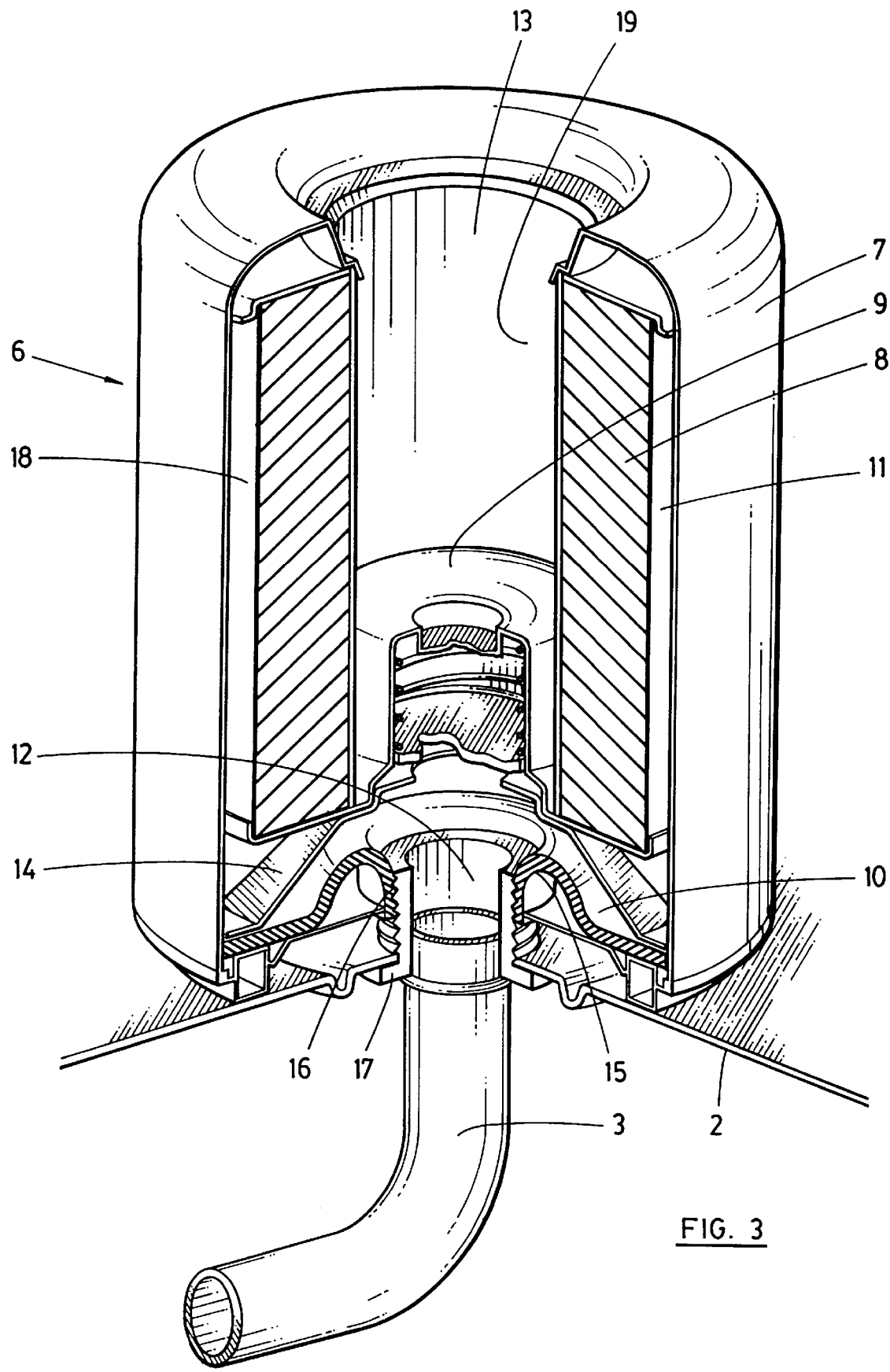
FIG. 3 is a sectional detail of the filter of this invention.

One preferred embodiment of the improved reservoir (1) of this invention, illustrated in FIGS. 1 to 3, comprises a well (2), an inlet pipe (3) to conduct fluid into the well (2) from the power steering mechanism (not shown), an outlet pipe (4) to conduct fluid from the well (2) to the power steering mechanism, a removable lid (5) to cover but to permit entry into the well (2), and a filter (6) to remove contaminants from the fluid.

The filter (6), which is best illustrated in FIG. 3, comprises a container (7) enclosing a filter medium (8), a pressure relief valve (9), a lower chamber (10), a side chamber (11), an inlet orifice (12) and an exit orifice (13). Between the side chamber (11) and the lower chamber (10) are legs (14) which support the pressure relief valve (9) and the filter medium (8) within the container (7). The floor (15) of the lower chamber (10) is adapted with a female threaded annulus (16) to screw onto a male threaded collar (17) to join the filter (6) over the inlet pipe (3) to receive fluid into the filter (6). The filter medium (8) has an outside surface (18) and an inside surface (19).

In operation, fluid entering the inlet pipe (3) passes into the lower chamber (10) between the supporting legs (14) to the side chamber (11) and through the outside surface (18), the filter medium (8) and the inside surface (19) into the exit orifice (13) to enter the well (2) of the reservoir (1). In the event of a surge of pressure in the fluid entering the inlet pipe (3), the pressure relief valve (9) permits the fluid to flow directly from the inlet pipe (3), through the lower chamber (10) into the pressure relief valve (9) and out the exit orifice (13) into the well (2) without passing through the filter medium (8).

The filter (6) of this embodiment may be screwed to the floor of the well (2). The removable lid (5) may be removed to change the filter (6) and replaced to seal the reservoir when the power steering mechanism is in operation.

Figure 4:
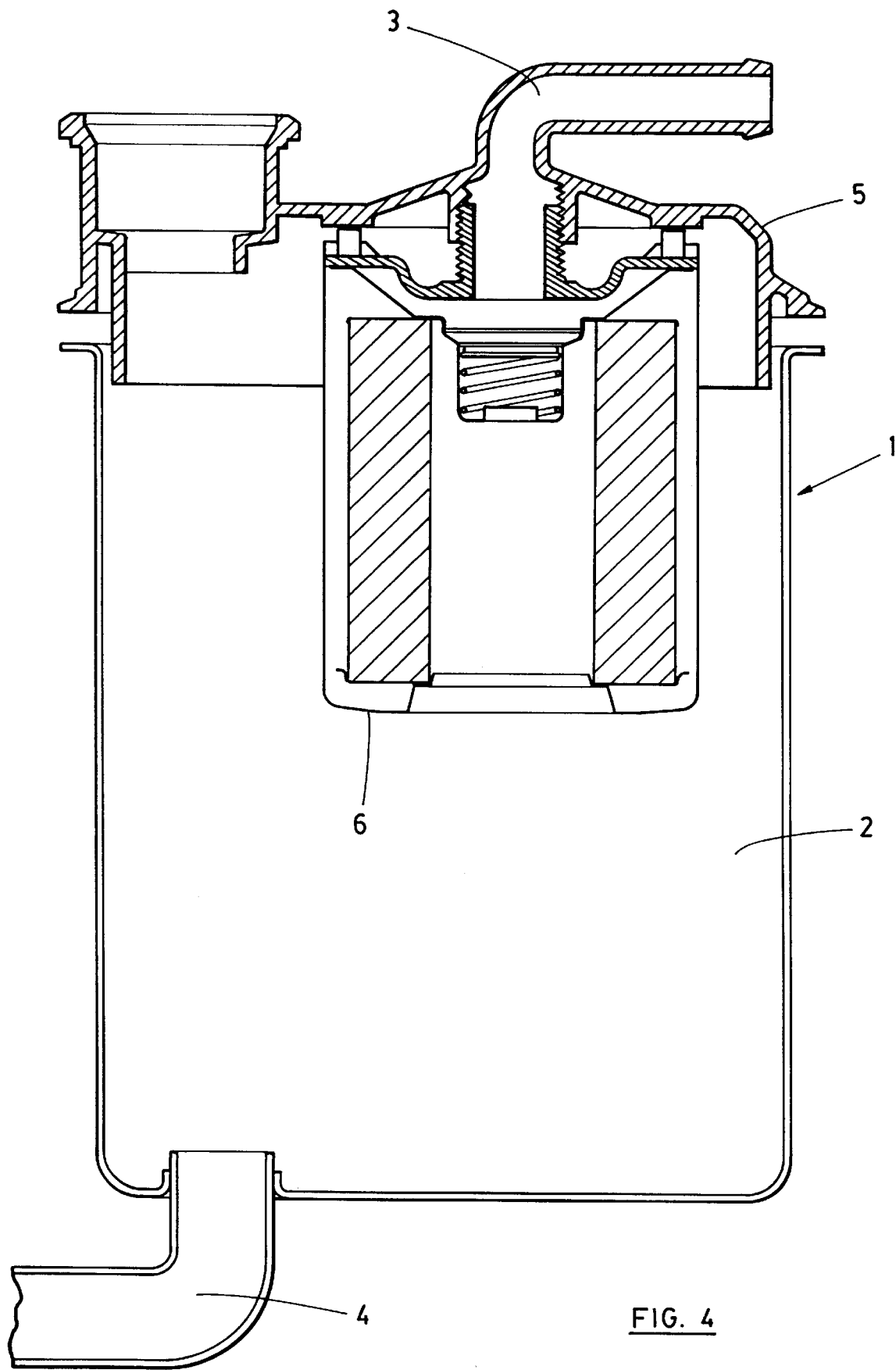
FIG. 4 is a sectional side view of a second embodiment of this invention.

A second and preferred embodiment of this invention is shown in FIG. 4 in which like elements of the first embodiment are given like numerical designations. This embodiment of the improved reservoir (1) also comprises a well (2), an inlet pipe (3) to conduct fluid into the well (2) from the power steering mechanism (not shown), an outlet pipe (4) to conduct fluid from the well (2) to the power steering mechanism, a removable lid (5) to cover but to permit entry into the well (2), and a filter (6) to remove contaminants from the fluid. However, in this embodiment, the inlet pipe (3) and the filter (6) are located in the lid (5) rather than on the floor (9) of the well (2). This permits the lid (5) to be removed and the filter (6) to be changed without the operator being required to wet his or her hands in the power steering fluid contained in the well (2).

It will be appreciated by those skilled in the art that the above description is intended to illustrate the nature of the invention by way of example and is not intended to limit the invention to the particular embodiments disclosed as examples. The true scope of this invention will be obtained by reading the specification as a whole.

The embodiments of the invention in which an exclusive property or privilege is claimed are defined as follows:

1. An improved reservoir for power steering fluid comprising:
   a well to contain a surplus of power steering fluid;
   an inlet to permit the flow of fluid from a power steering mechanism into the well
   an outlet to permit the fluid to flow out of the well to the power steering mechanism;
   a filter removably attached over said inlet within the well to receive and to filter the fluid;
   a first connecting means associated with said inlet to which said filter removably attaches; and
   a removable lid to permit access to the well to replace the filter,
   said filter including:
      a ring shaped container having two ends with an inlet orifice at one end that attaches removably over the inlet to the well to receive fluid into the filter, and an exit orifice at the other end to exhaust fluid into the well;
      a second connecting means associated with said inlet orifice of said container to cooperate with said first connecting means associated with the inlet to the well to removably attach said filter over said inlet to the well;
      a chamber within said container to receive fluid through the inlet orifice from the inlet;
      a side chamber within said container to receive fluid from said chamber;
      a ring shaped filter medium having an outer surface and an inner surface disposed within said container adjacent the chamber and inside the side chamber to receive and to transmit fluid from said outer surface to the inner surface of said filter medium to the exit orifice of said container;
      a pressure relief valve disposed within said container between the chamber and the exit orifice of the container to permit fluid received in the chamber at a pressure at or above a predetermined pressure to flow through the pressure relief valve directly to the exit orifice of the container.

2. The improved reservoir of claim 1, where in said first connecting means is a male threaded collar and said second connecting means is a female threaded annulus.

3. The improved reservoir of claim 2 in which the filter and the inlet are located in the well.

4. The improved reservoir of claim 2 in which the inlet and the filter are located in the removable lid.

5. An improved filter for use with a reservoir for power steering fluid, the reservoir comprising:
   a well to contain a surplus of power steering fluid;
   an inlet to permit the flow of fluid from a power steering mechanism into the well;
   an outlet to permit the fluid to flow out of the well to the power steering mechanism;
   a removable lid to permit access to the well,
   wherein said filter is removably attached over said inlet within the well of the reservoir to receive and to filter the fluid and a first connecting means is associated with said inlet to which said filter removably attaches;
   said filter comprises:
      a ring shaped container having two ends within an inlet orifice at one end that attaches removably over the inlet to the well to receive fluid into the filter, and an exit orifice at the other end to exhaust fluid into the well;
      a second connecting means associated with said inlet orifice of said container to cooperate with said first connecting means associated with the inlet to the well to removably attach said filter over said inlet to the well:
      a chamber within said container to receive fluid through the inlet orifice from the inlet;
      a side chamber within said container to receive fluid from said chamber;
      a ring shaped filter medium having an outer surface and an inner surface disposed within said container adjacent the chamber and inside the side chamber to receive and to transmit fluid from said outer surface to the inner surface of said filter medium to the exit orifice of said container;
      a pressure relief valve disposed within said container between the chamber and the exit orifice of the container to permit fluid received in the chamber at a pressure at or above a predetermined pressure to flow through the pressure relief valve directly to the exit orifice of the container.

* * * * *

UNITED STATES PATENT AND TRADEMARK OFFICE
CERTIFICATE OF CORRECTION

PATENT NO. : 5,906,221
DATED : May 25, 1999
INVENTOR(S) : MANCELL

It is certified that error appears in the above-identified patent and that said Letters Patent is hereby corrected as shown below:

Col. 3, line 40, after "well", insert --;--.

Col. 4, line 35, delete "within" and insert --with--.

Signed and Sealed this

Twenty-eighth Day of December, 1999

Q. TODD DICKINSON

Attest:

Attesting Officer

Acting Commissioner of Patents and Trademarks